(No Model.)
E. NEILD.
BICYCLE WHEEL.
No. 574,105. Patented Dec. 29, 1896.
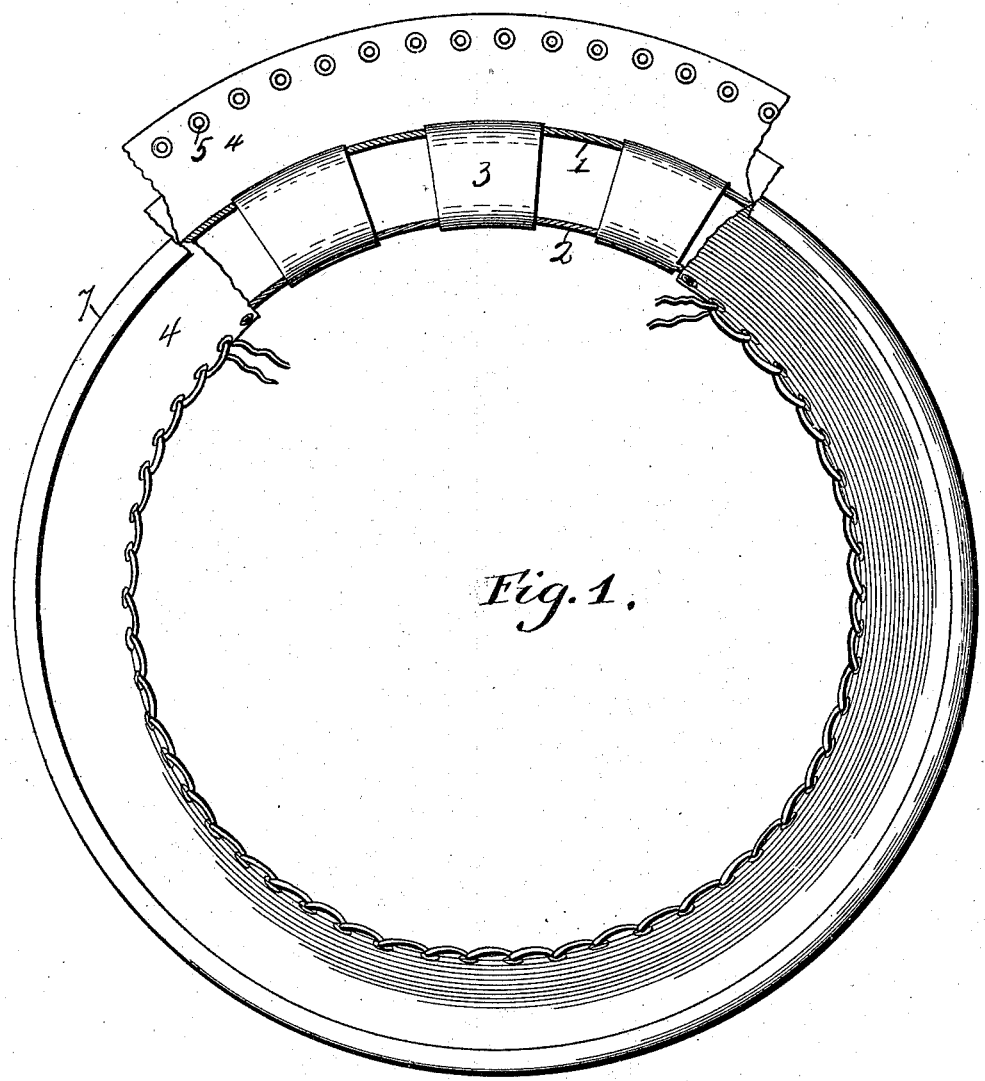
Fig. 1.
Fig. 2.
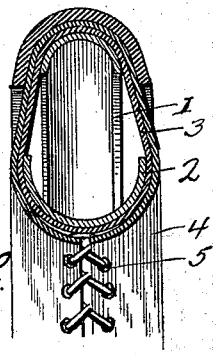
Witnesses:
J. B. McGirr.
R. S. C. Caldwell.
Inventor:
Edwin Neild
by Frank Gappleman
atty

UNITED STATES PATENT OFFICE.

EDWIN NEILD, OF LAREDO, TEXAS, ASSIGNOR OF ONE-HALF TO A. WINSLOW AND HENRY HEIN, OF SAME PLACE.

BICYCLE-WHEEL.

SPECIFICATION forming part of Letters Patent No. 574,105, dated December 29, 1896.

Application filed December 14, 1895. Serial No. 572,187. (No model.)

*To all whom it may concern:*

Be it known that I, EDWIN NEILD, a citizen of the United States of America, residing at Laredo, in the county of Webb and State of Texas, have invented certain new and useful Improvements in Bicycle-Wheels, of which the following is a specification, reference being had to the accompanying drawings.

The object of this invention is to produce a rim and tire for bicycle-wheels formed without pneumatic tubes and which will give the spring and comfort that are produced by the well-known pneumatic tires.

A further object of the invention is to produce a wheel which will possess the advantages of pneumatic tires and prove impervious to puncture, also in making the same strong, durable, and efficient, as well as comparatively inexpensive to produce and sustain.

With these and other objects in view the invention consists in the novel details of construction, arrangement, and combination of parts to be hereinafter more fully described and claimed, said description being so full, clear, and exact as to enable others skilled in the art to which it appertains to make and use the same, reference being had to the accompanying drawings, forming part of the specification, in which like numerals denote corresponding parts in both views.

Figure 1 is a view in elevation, partly in section, of my invention. Fig. 2 is a transverse sectional view of the same.

In the drawings, 1 denotes the outer rim, and 2 the inner rim, which receives the ends of the spokes. These rims 1 and 2 are arranged at any suitable distance apart and are connected by a series of elastic bands 3, which hold the said rims in their proper relative positions and assist the outer casing (to be hereinafter referred to) in supporting the weight and adding to the spring effect of the casing. In attaching these bands I pass them around the outside of the rims and secure them in place by cement.

The casing 4 consists of elastic material so cut as to surround the inner and outer rims and strips, to which it is attached by cement or the like, the edges approximating on the under side of the rim, where it is provided with eyes 5 to receive the lacing 6, by which the same is firmly secured.

As shown in Fig. 2, the tension on the casing may be varied by the lacings, thus varying the elasticity, as will be understood.

A tire 7 is arranged on the rim and consists of an approximately semicircular rubber bearing-surface of sufficient thickness to produce a safe bite on the road-bed.

Having fully described my invention in detail, what I claim as new, and desire to secure by Letters Patent, is—

1. A rim for bicycles composed of inner and outer sections with an intervening space, elastic bands enveloping the sections at regular intervals, an elastic casing surrounding and secured to the outer section and laced on the under side of the inner section as and for the purpose described.

2. A rim for bicycles composed of inner and outer sections with an intervening space, elastic bands enveloping the section at regular intervals, an elastic casing surrounding and secured to the outer section and laced on the under side of the inner section and a band-tire semicircular in cross-section secured to the outer section, as and for the purpose described.

In testimony whereof I affix my signature in presence of two witnesses.

EDWIN NEILD.

Witnesses:
C. L. REESE,
F. G. ARNOLD.